United States Patent [19]
Sasanuma et al.

[11] Patent Number: 5,583,644
[45] Date of Patent: Dec. 10, 1996

[54] SYSTEM FOR CORRECTING IMAGE DENSITY OF AN IMAGE FORMING SYSTEM BASED ON A DETECTION RESULT OF A TEST IMAGE

[75] Inventors: Nobuatsu Sasanuma, Yokohama; Hisashi Fukushima, Kawasaki; Tetsuya Atsumi, Tokyo, all of Japan

[73] Assignee: Canon Kabushiki Kaisha, Tokyo, Japan

[21] Appl. No.: 172,106

[22] Filed: Dec. 23, 1993

[30] Foreign Application Priority Data

Dec. 28, 1992 [JP] Japan .................................. 4-349643

[51] Int. Cl.$^6$ ............................. H04N 1/00; H04N 1/29; H04N 1/46; G03F 3/08; G03G 21/00
[52] U.S. Cl. .......................... 358/296; 358/300; 358/406; 358/504; 358/519; 358/523; 355/208
[58] Field of Search .................................. 358/296, 298, 358/300, 406, 474, 504, 505, 519, 523, 524; 355/203, 204, 207, 208, 210, 214; 382/319; 347/131, 133, 188, 189

[56] References Cited

U.S. PATENT DOCUMENTS

| | | | |
|---|---|---|---|
| 4,680,646 | 7/1987 | Ikeda et al. | 358/298 |
| 4,888,636 | 12/1989 | Abe | 358/80 |
| 4,949,135 | 8/1990 | Ng | 355/327 |
| 5,060,013 | 10/1991 | Spence | 355/208 |
| 5,148,289 | 9/1992 | Nishiyama et al. | 358/300 |
| 5,241,347 | 8/1993 | Kodama | 355/208 X |
| 5,258,783 | 11/1993 | Sasanuma et al. | 346/157 |
| 5,345,315 | 9/1994 | Shalit | 358/406 |
| 5,463,473 | 10/1995 | Yamada et al. | 358/300 |

FOREIGN PATENT DOCUMENTS

| | | | |
|---|---|---|---|
| 0266186 | 5/1988 | European Pat. Off. | H04N 1/46 |
| 4-268873 | 9/1992 | Japan | H04N 1/40 |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image forming system includes a generator for generating an image signal representing a predetermined test image having a plurality of tone levels, an image forming device for forming the predetermined test image on a recording medium based on the signal, a first measuring device for measuring density levels of the formed predetermined test image, corresponding to each of the plurality of tone levels of the image signal, a controller for determining characteristics of a change of density levels in the predetermined test image to a change of tone levels in the image signal based on a plurality of density levels measured by the first measuring device, and for making a conversion data table for converting tone levels of an input image signal in accordance with the characteristics, a designator for generating instructions for designation a correction of the conversion data table, a transferring device for transferring the image formed on the recording medium to a recording sheet, a second measuring device for measuring density levels of the image on the recording sheet, wherein the controller controls the generator, the image forming device, and the transferring devices to correct the conversion data table based on the density levels measured by the second measuring device.

13 Claims, 18 Drawing Sheets

YELLOW TONER

MAGENTA TONER

CYAN TONER

BLACK TONER

SYSTEM FOR CORRECTING IMAGE DENSITY OF AN IMAGE FORMING SYSTEM BASED ON A DETECTION RESULT OF A TEST IMAGE

BACKGROUND OF THE INVENTION

1. Field of the Invention

The present invention relates to an image forming apparatus which forms a test image on a recording medium and measures the density of the test image, and then determines an image forming condition based on the measurement result.

2. Description of Related Art

A method for adjusting image processing characteristics in image forming apparatuses, such as a copying machine or a printer, includes: starting the image forming apparatus; after warming-up operation, forming a specific pattern image on an image holding member (e.g. a photosensitive drum) measuring the density of the pattern image; and based on a density value, changing an operation parameter of a circuit such as a γ corrector for determining an image forming condition, to maintain image quality.

In a case where image forming characteristic is changed due to change in environmental conditions, again the specific pattern image is formed on the image holding member. Also, the density of the formed pattern image is measured again, and the measurement results is fed back to the circuit for determining the image forming condition such as the γ corrector. Thus, image quality can be maintained in accordance with the amount of the change in the environmental conditions.

However, if the image forming apparatus is used for a long term, the measurement result of test pattern density on the image holding member might not correspond with that of an actually-formed image on a paper. For example, a cleaning blade for cleaning excessive toner is provided in contact with the photosensitive drum. The contact state for a long time may roughen the photosensitive drum surface, and relation between the amount of toner adhered onto the photosensitive drum and reflected light amount from the photosensitive drum upon density measurement may change. Accordingly, in an image forming apparatus used for a long term, if the image forming condition is determined using a density conversion parameter based on density data from initial measurement, image of corresponding density to the image data cannot be obtained.

SUMMARY OF THE INVENTION

The present invention has as its object to provide an image forming apparatus in which the above drawback is eliminated.

Another object of the present invention is to provide an image forming method and apparatus which prevent image quality from deterioration due to degradation of parts in long use.

Further object of the present invention is to provide an image forming apparatus which compensates transition of the relation between the density of image formed on a recording medium and result of measurement of the image density on an image holding member so as to always obtain a high-quality image.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

FIRST EMBODIMENT

Figure 1:
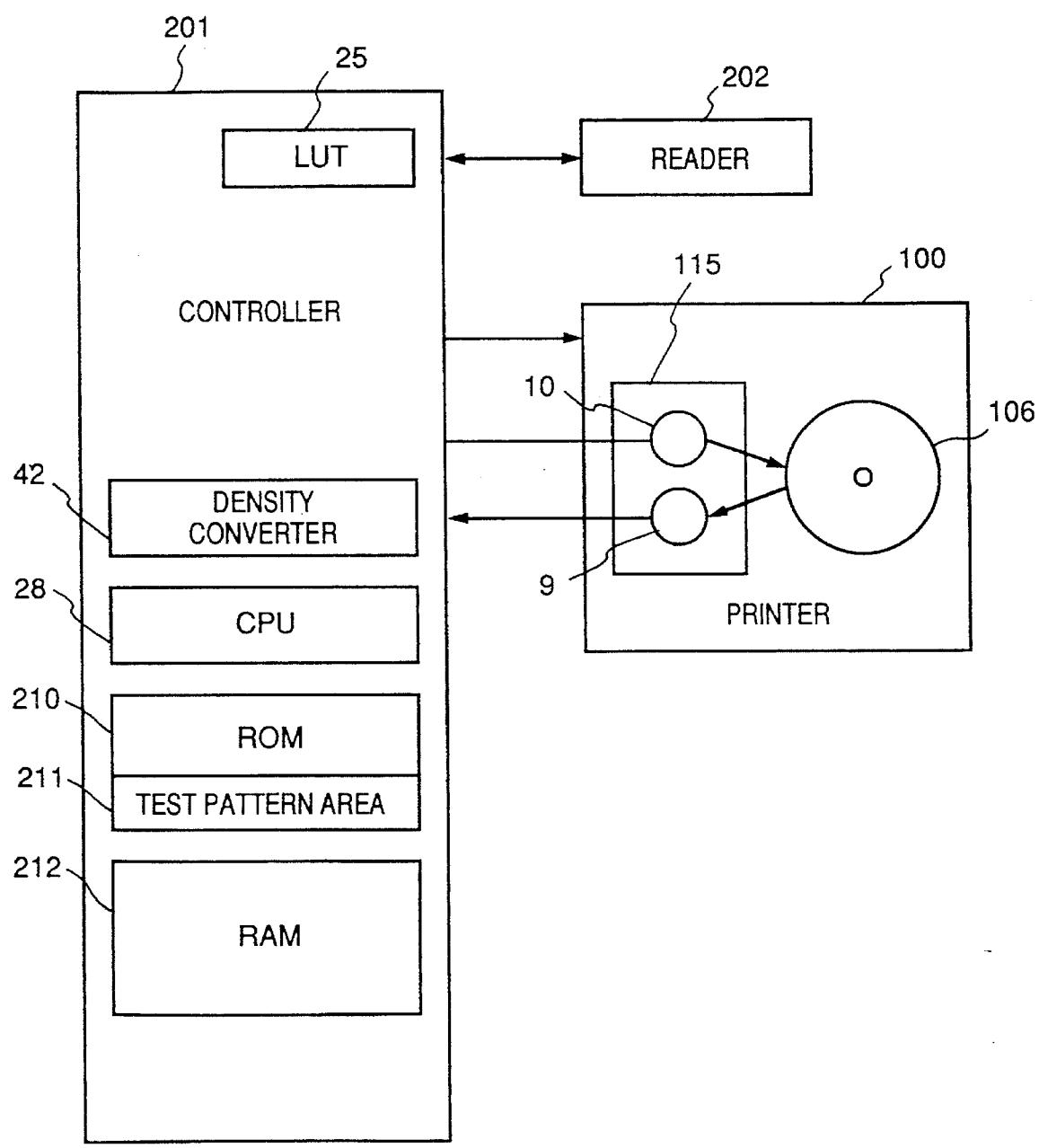
FIG. 1 is a block diagram showing the configuration of a copying machine according to a first embodiment of the present invention.

FIG. 1 is a block diagram showing a color copying machine according to the first embodiment.

Figure 2:
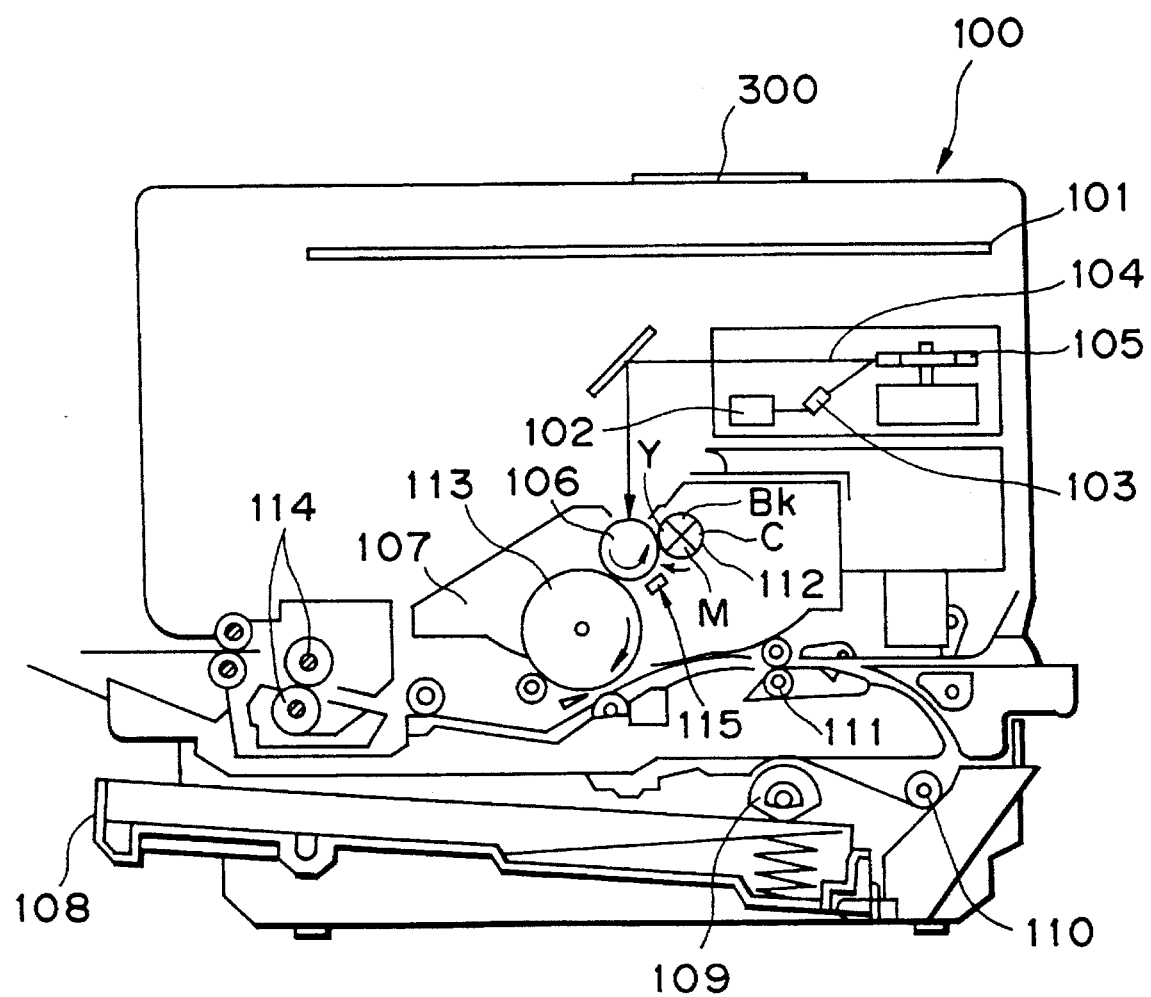
FIG. 2 is a sectional view of a printer of the copying machine in the first embodiment.

In FIG. 1, reference numeral 201 denotes a controller for controlling the overall copying machine. The controller 201 comprises CPU 28, which is, e.g., a microprocessor, ROM 210 in which control programs for the CPU 28 and various data are stored, and RAM 212 used as a work area for the CPU 28. Test pattern data to be described later is stored in a test pattern area 211 of the ROM 210. Numeral 202 denotes an original image reader having a CCD sensor 21. The reader 202 reads an original image and outputs a read image signal to the controller 201. The image signal from the CCD 21 is corrected using a look-up table (LUT) 25 to be described later and outputted to a printer 100. The printer 100 comprises. e.g., a laser-beam printer as shown in FIG. 2. Numeral 115 denotes a sensor unit for examining the surface of photosensitive drum 106. The sensor unit 115 comprises an LED 10 and a photosensor 9. Density converter 42 of the controller 201 performs conversion on a signal from the photosensor 9 and inputs the converted signal into the CPU 28 for performing control based on this signal. The above construction will be described in detail with reference to the subsequent drawings.

FIG. 2 is a sectional view of the structure of the laser-beam printer (LBP) of the printer 100.

In FIG. 2, the printer 100 forms an image based on an image signal from the reader 202 on a recording sheet as a recording medium. Numeral 300 denotes an operation panel on which various operation switches, LED's and display and the like are provided; and 101, a printer control unit for controlling the overall printer 100 and analyzing information such as character information from a host computer. The printer control unit 101 converts the image signal into a semiconductor laser driving signal, and outputs the signal to a laser driver 102.

The laser driver 102 drives a semiconductor laser 103 by on-off switching the semiconductor laser in accordance with the input image signal. Laser light 104 scans on the photosensitive drum 106 in a right-and-left direction by rotation of a polygon mirror 105, thus forming a latent image on the photosensitive drum 106. As shown in FIG. 2, the drum 106 turns in a direction represented by an arrow. The latent image is developed by rotating a developer 112 in respective colors (FIG. 2 shows yellow toner development). 107 denotes a developing unit.

On the other hand, the recording sheet is rolled around a transfer drum 113. The drum 113 turns four times for four colors, and the rotating developer 112 develops images in order Y (yellow)→M (magenta)→C (cyan)→Bk (black) each time the drum 113 turns, thus the four color images are transferred onto the recording sheet. Thereafter, the recording sheet is removed from the transfer drum 113. Fixing rollers 114 fix the image on the recording sheet, and the color print image is completed. The recording sheets are cut sheets set in a paper cassette 108 attached to the printer 100. Paper feeding roller 109 and paper conveying rollers 110 and 111 introduce the recording sheet into the printer 100, and supply the sheet to the transfer drum 113. The drum surface sensor unit 115 comprises the LED 10 which emits near infrared radiation (main wavelength: 960 nm) to irradiate the surface of the photosensitive drum 106, and the photosensor 9 which detects reflected light from the photosensitive drum 106.

Figure 3:
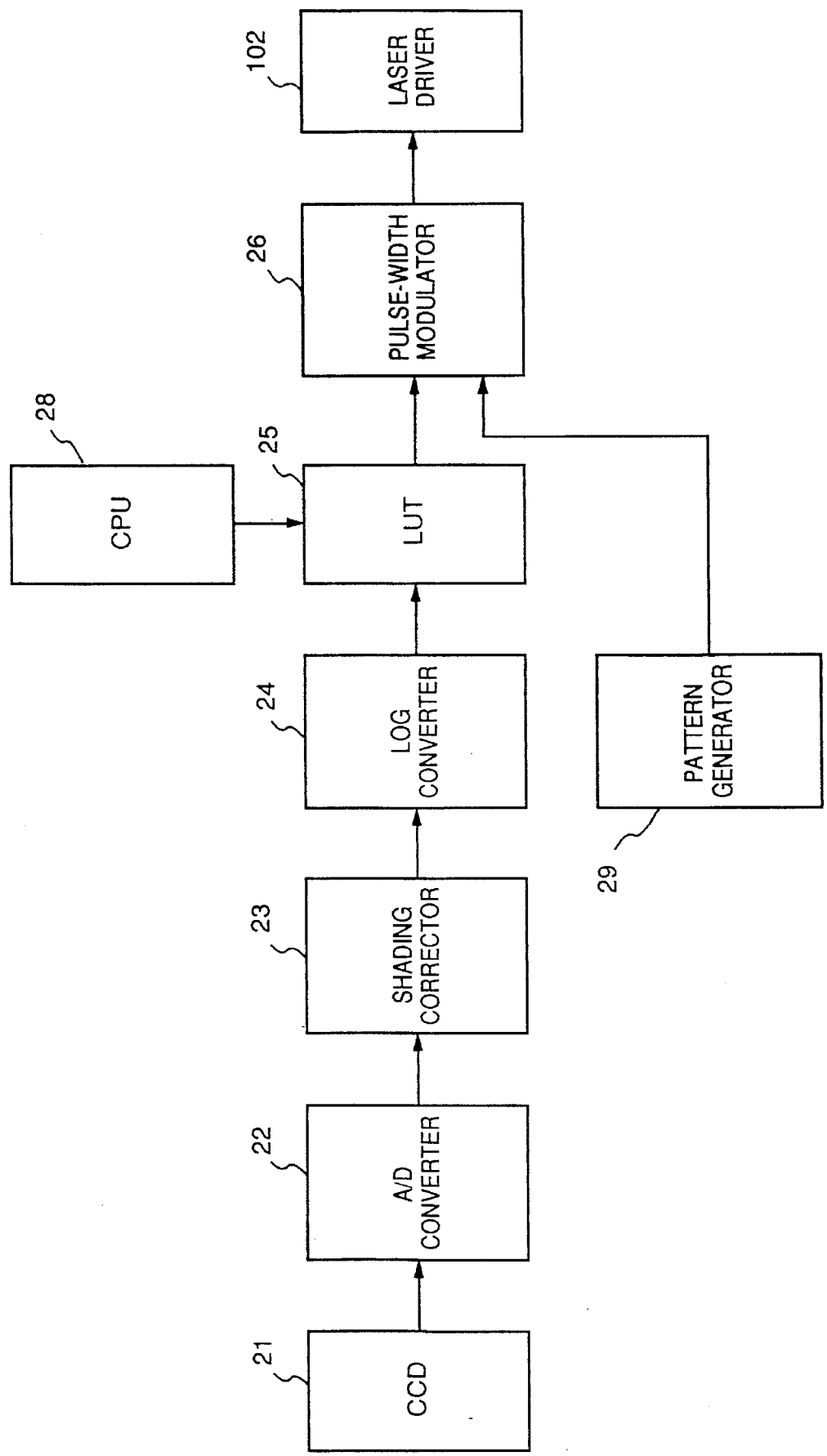
FIG. 3 is a block diagram showing the construction of an image signal processor for processing an electric signal from a CCD of a reader in the first embodiment.

FIG. 3 is a block diagram showing the construction of an image signal processor for obtaining a pattern image of tone levels. The image signal processor is provided in the controller 201.

When the CCD 21 of the reader 202 reads an original image and outputs an analog luminance signal, an A/D converter 22 converts the analog luminance signal to a digital luminance signal. Shading corrector 23 inputs the digital luminance signal and corrects the fluctuation of the digital luminance signal came from the unevenness of the sensitivity of sensors of the CCD 21. LOG converter 24 performs LOG-conversion to the shading-corrected luminance signal. The LOG-converted signal is converted using a look-up table (LUT) 25 so that an output image density processed in accordance with the initially-set γ characteristic of the printer 100 will correspond to the original image density. Pulse-width modulator 26 performs pulse-width modulation upon the converted image signal, and outputs the signal to the laser driver 102. The laser driver 102 drives the semiconductor laser 103 in accordance with the pulse-width-modulated signal. Pattern generator 29 generates a pattern of various tone levels to be described later.

In the present embodiment, pulse-width modulation is employed as tone-representation. Laser light which is pulse-width modulated scans on the photosensitive drum 106 to form a latent image in which one pixel width depends upon the density of the pixel. Through development, transfer and fixing processes, a half-tone image can be obtained.

Figure 4:
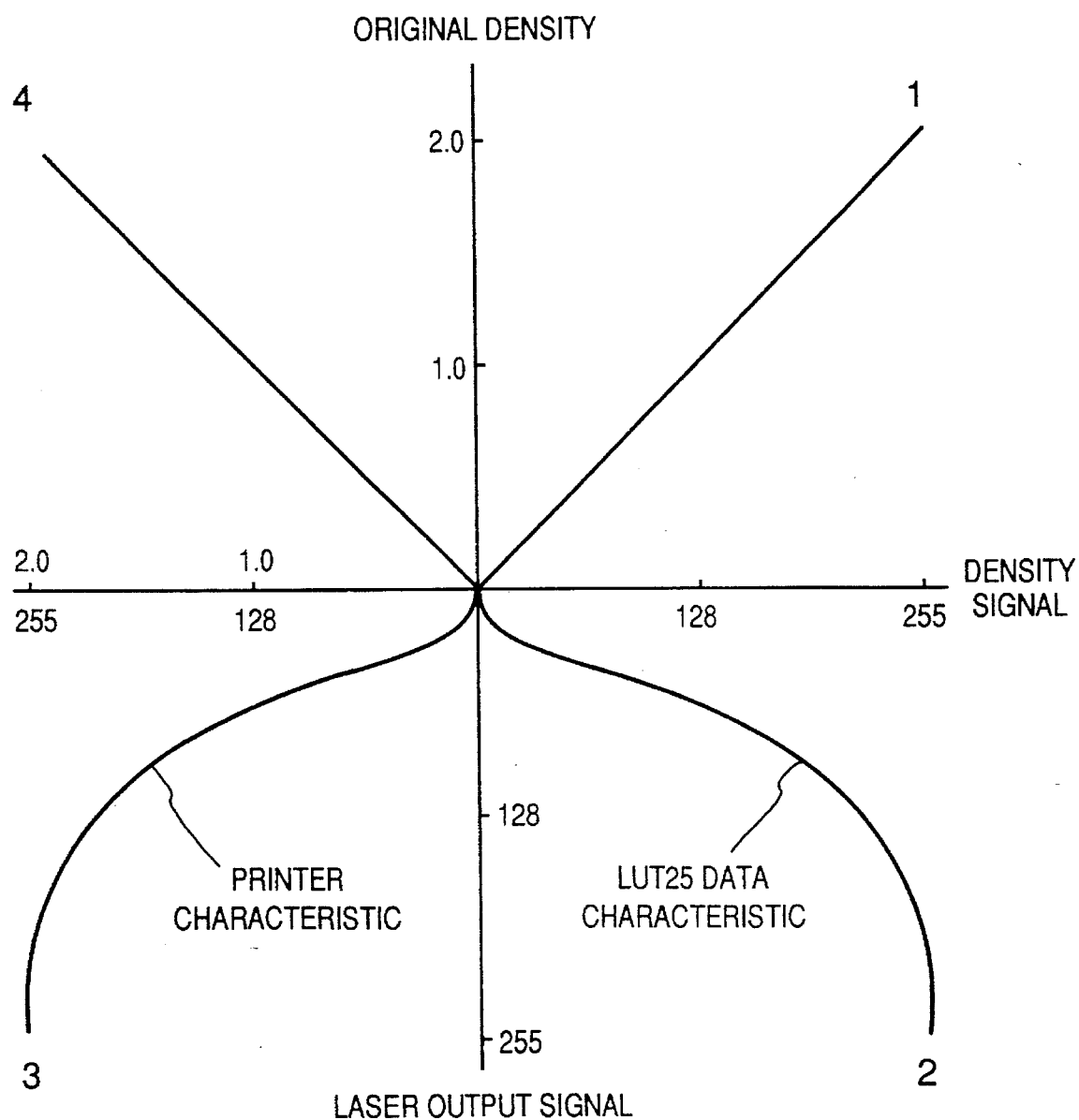
FIG. 4 is a four-quadrant chart showing the relation between in an original image density (image data density) and the density of an actually-printed image.

FIG. 4 is a four-quadrant chart showing density reproducing characteristics of original image.

In FIG. 4, the first quadrant (upper right) shows the characteristic of the reader 202 which outputs an original image density as a density signal; the second quadrant (lower right), the characteristic of the LUT 25 which converts the density signal to a laser output signal; the third quadrant (lower left), recording characteristic of the printer 100 which converts the laser output signal to a recording density; and the fourth quadrant (upper left), as the relation between the original image density and the density of a printed image in the copying machine of the present embodiment. Regarding the number of tone-levels, as an eight-bit digital signal is employed, image data has two-hundred and fifty-six tone levels.

In the fourth quadrant, to obtain a linear tone characteristic as shown in FIG. 4, a curvature of the printer characteristic in the third quadrant is corrected with the characteristic of the LUT 25 in the second quadrant. The LUT data of the LUT 25 is generated from calculation to be described later.

In the copying machine of the present embodiment, a predetermined test pattern is stored in the test pattern area 211 of the ROM 210 in advance, and based on this pattern, a test pattern image is formed.

Figure 5:
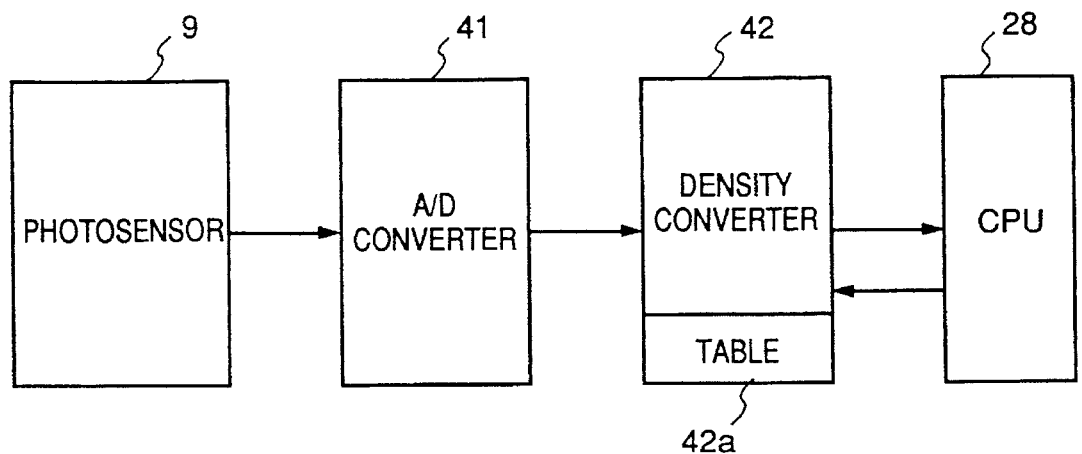
FIG. 5 is a block diagram showing the construction of a circuit for processing a signal from a photosensor of a drum surface unit.

FIG. 5 is a block diagram showing a processor for processing a signal from the photosensor 9 of the drum surface sensor unit 115. The processor is provided in the controller 201.

The photosensor 9 receives the near infrared radiation, emitted from the LED 10 and reflected from the surface of the photosensitive drum 106, and converts the near infrared radiation to an electric signal. The A/D converter 41 converts the electric signal to a digital signal. That is, 0–5 V output voltage of the photosensor 9 is converted to 0–255 levels digital signal. Further, the density converter 42 converts the digital signal to a density signal using a conversion table 42a, and inputs the density signal into the CPU 28. Color toner employed in the copying machine of the present embodiment comprises separately arranged yellow, magenta and cyan toners, each having styrene copolymerized resin as binder.

Figure 6:
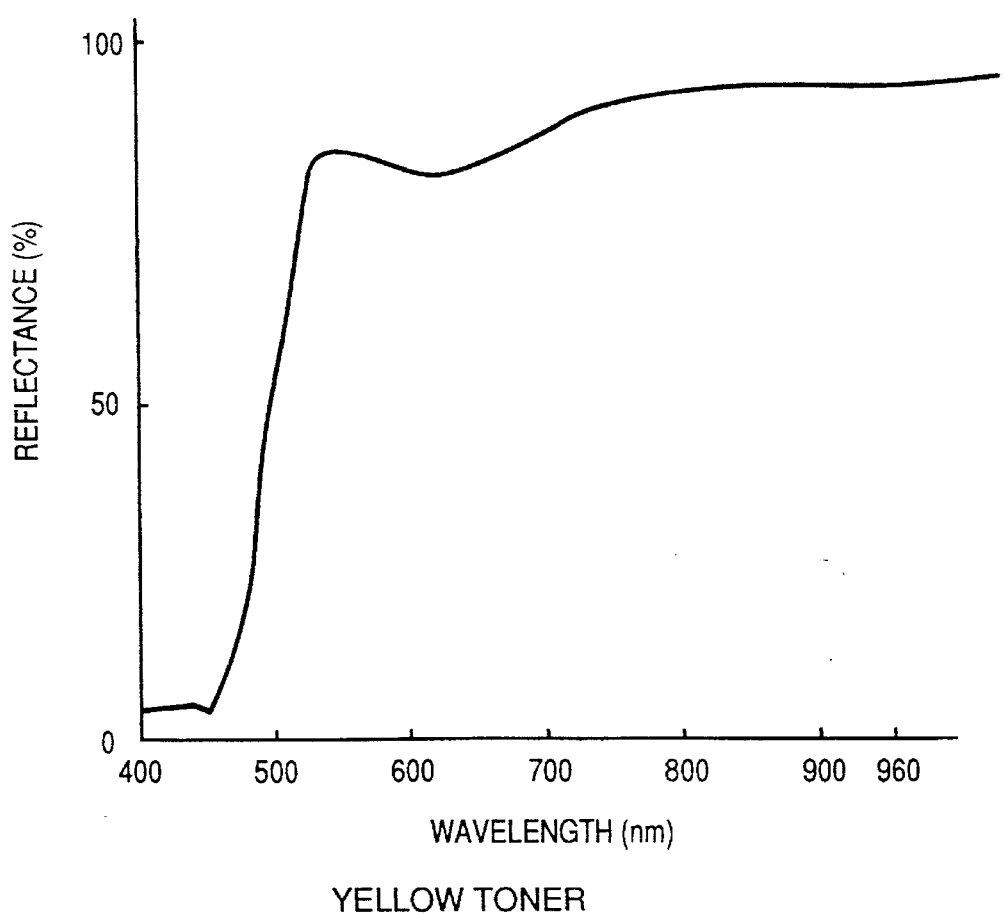
FIG. 6 is a line chart showing a yellow toner spectral characteristic.
Figure 7:
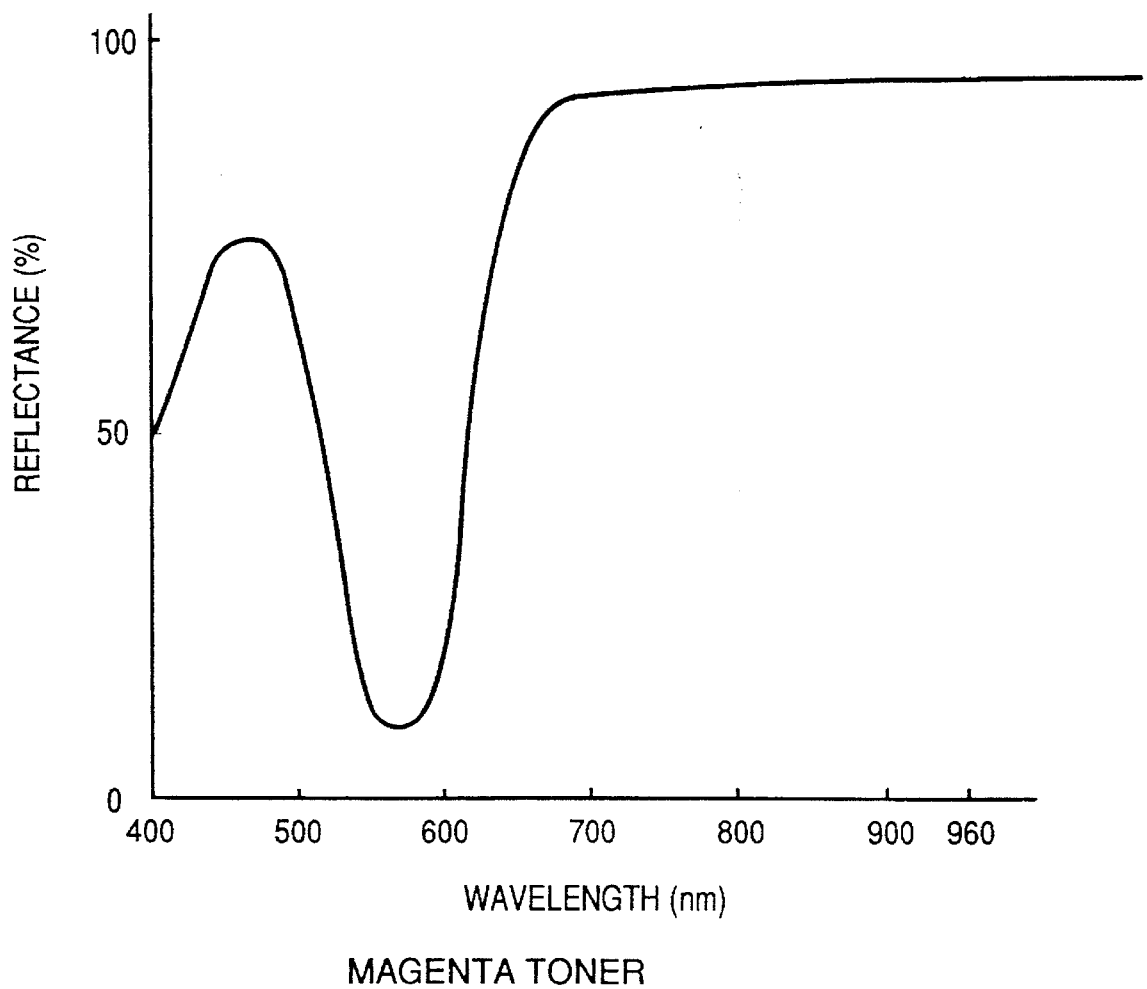
FIG. 7 is a line chart showing a magenta toner spectral characteristic.
Figure 8:
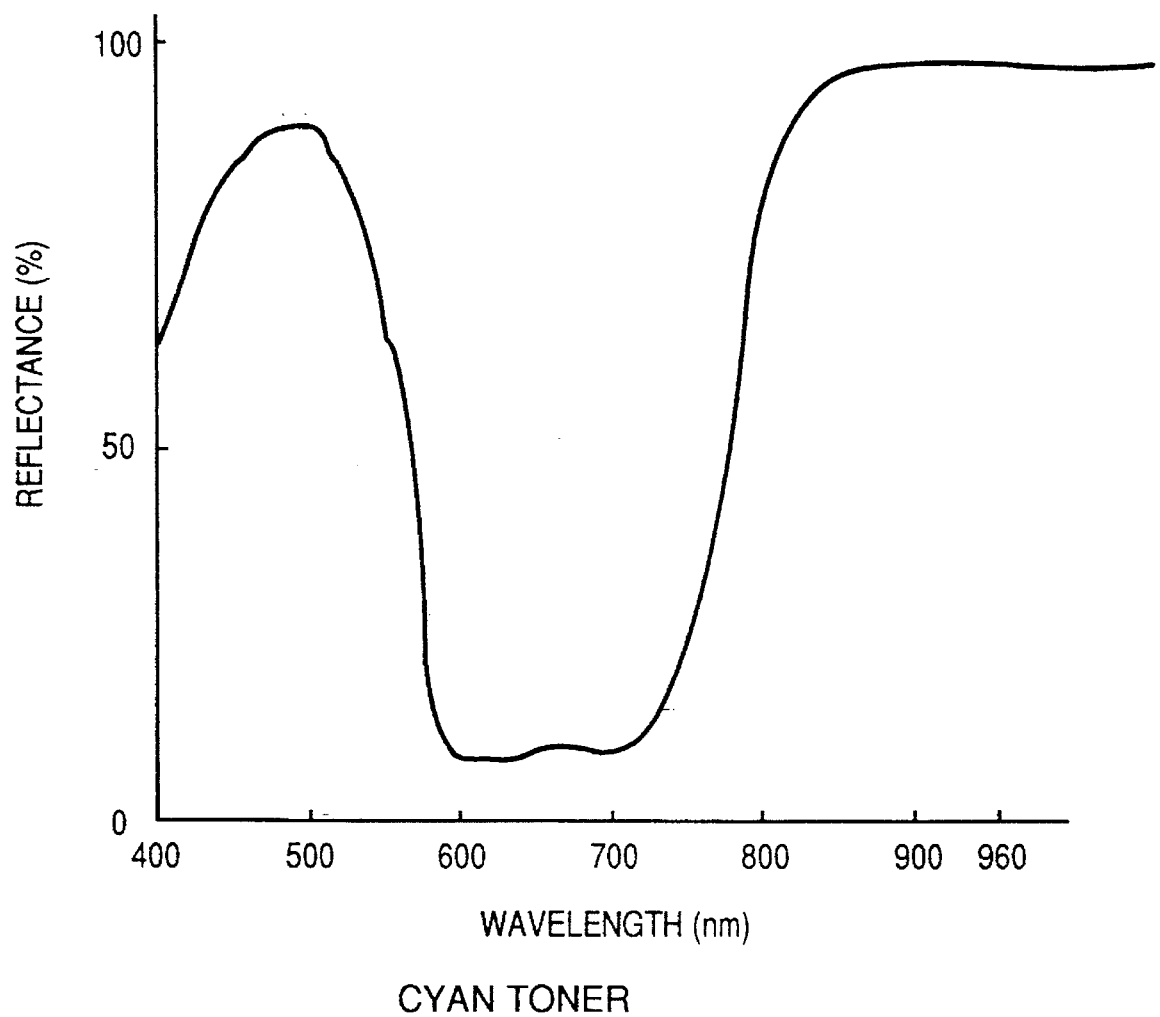
FIG. 8 is a line chart showing a cyan toner spectral characteristic.

FIGS. 6 to 8 show spectral characteristics of the respective yellow, magenta and cyan toners. As it is apparent from these figures, in each color, the reflectance to the near infrared radiation (960 nm) is over 80%. In image formation using these color toners, two-component developing method which is advantageous for attaining color purity and transparency is employed.

Figure 9:
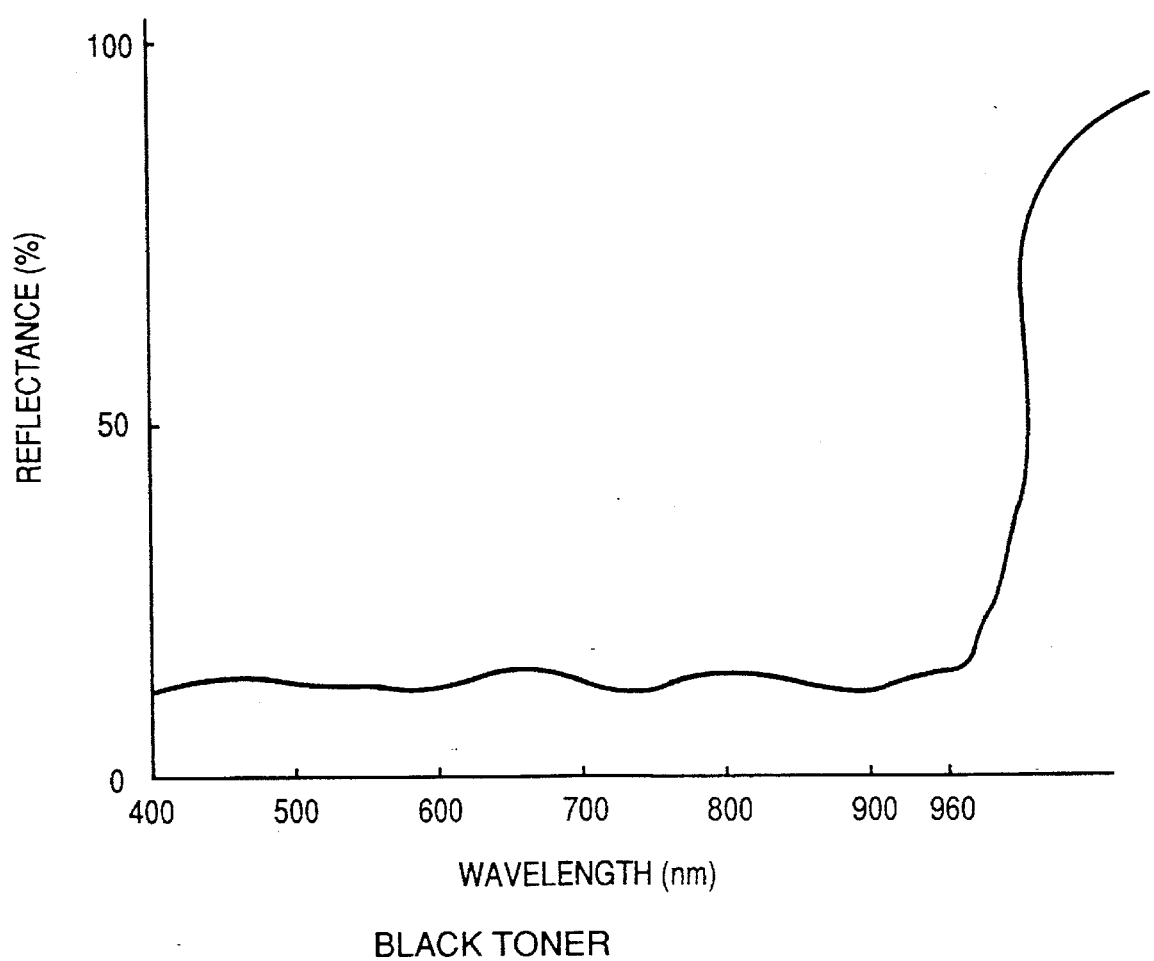
FIG. 9 is a line chart showing a black toner spectral characteristic (one-component magnetism)

On the other hand, black toner is one-component magnetism toner which is for monochromatic copying and is effective to reduce running cost. FIG. 9 shows the spectral characteristic of the black toner. As apparent from FIG. 9, the reflectance to the near-infrared radiation (960 nm) is about 10%. In this embodiment, the black toner is developed by the one-component jumping method. Note that this developing method can be applied to two-component black toner.

The photosensitive drum 106 is an OPC (Organic Photo Conductor) drum having about 40% reflectance to the near-infrared radiation (960 nm). The drum 106 may be an amorphous silicon drum.

Figure 10:
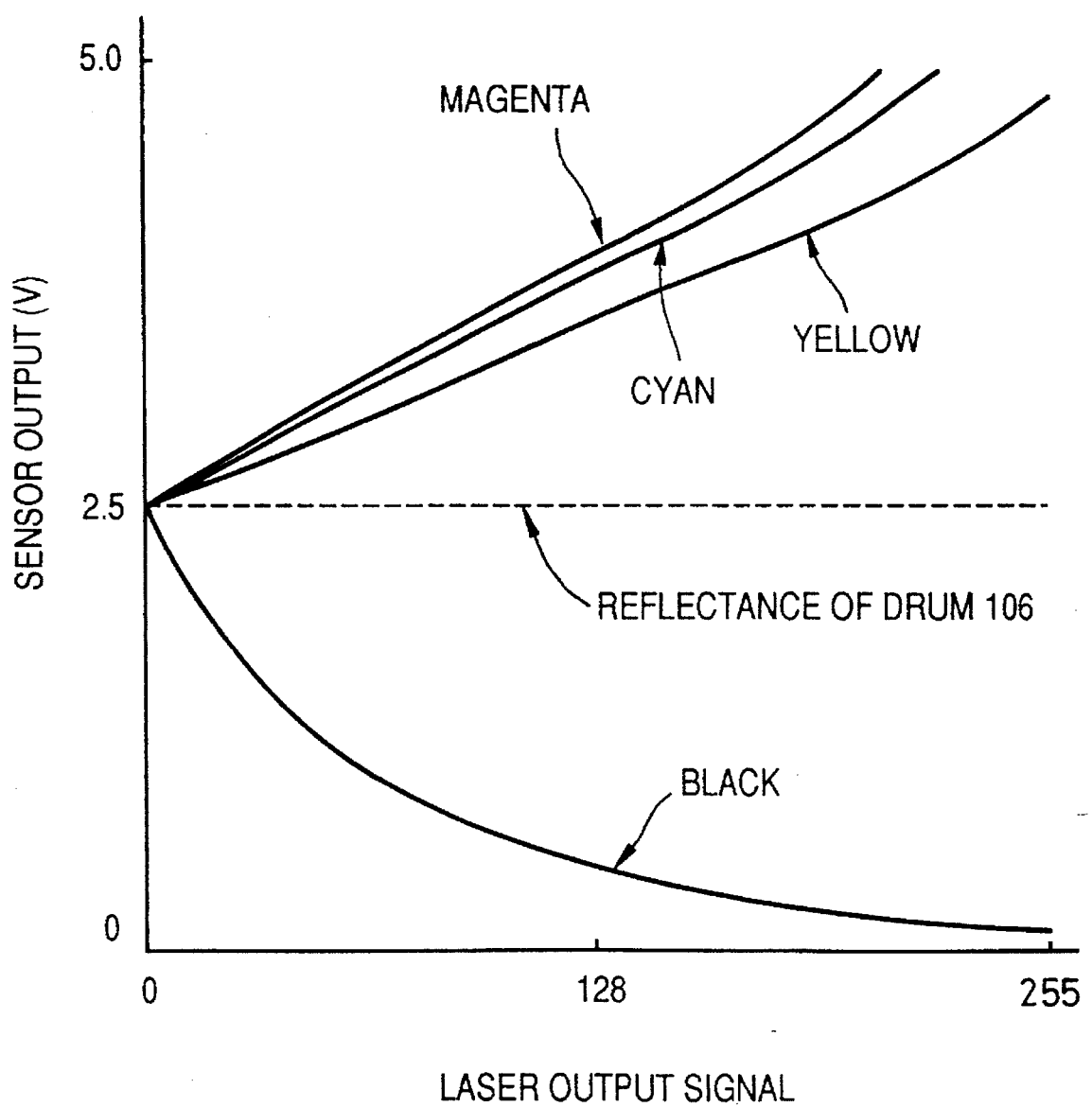
FIG. 10 is a line chart showing the relation between an laser output and the density on an photosensitive drum holding toner image formed by the laser.

FIG. 10 shows the relation between an output image density and the output of the photosensor 9 upon stepwisely changing the density of respective color images formed on the photosensitive drum 106. In FIG. 10, when no toner is adhered onto the drum 106, the photosensor output is 2.5 V, i.e., one-hundred and twenty-eight level.

As it is understood from FIG. 10, as laser output signal level increases, area covering rates (image density) of the respective yellow, magenta and cyan color toners raise, the intensity of reflection light from the photosensitive drum 106 increases, and the photosensor 9 output becomes greater. On the other hand, as the area covering rate (image density) of black toner raises, the reflectance from the black toner becomes lower, and as a result, the photosensor 9 output decreases.

Figure 11:
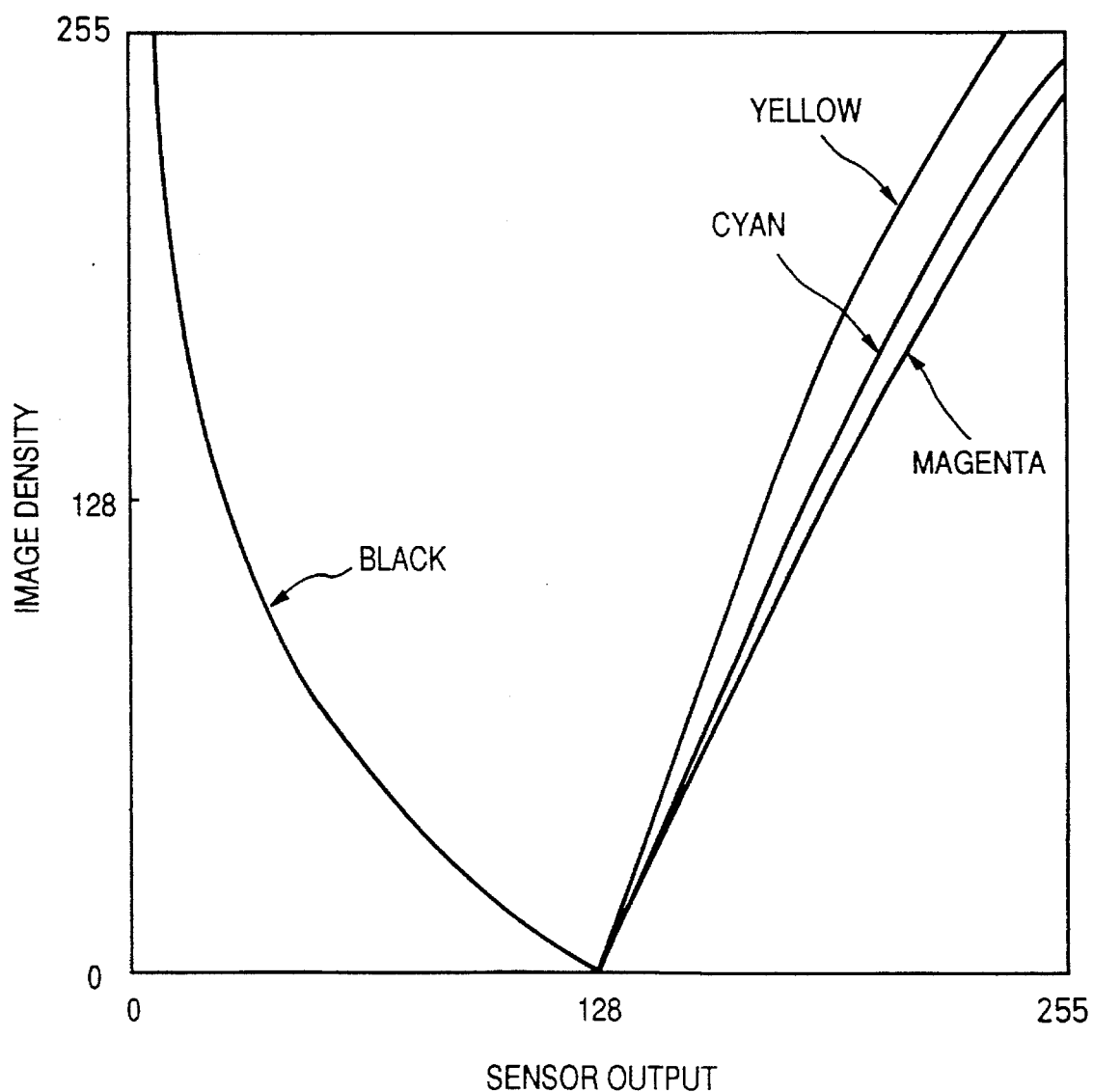
FIG. 11 is a line chart showing conversion characteristics for converting a photosensor signal to a density signal with respect to each color.

The density conversion table 42a has data characteristic for converting the photosensor 9 output to a density signal in each color, as shown in FIG. 11, thus enabling to detect the density of an original image with high precision.

Figure 12:
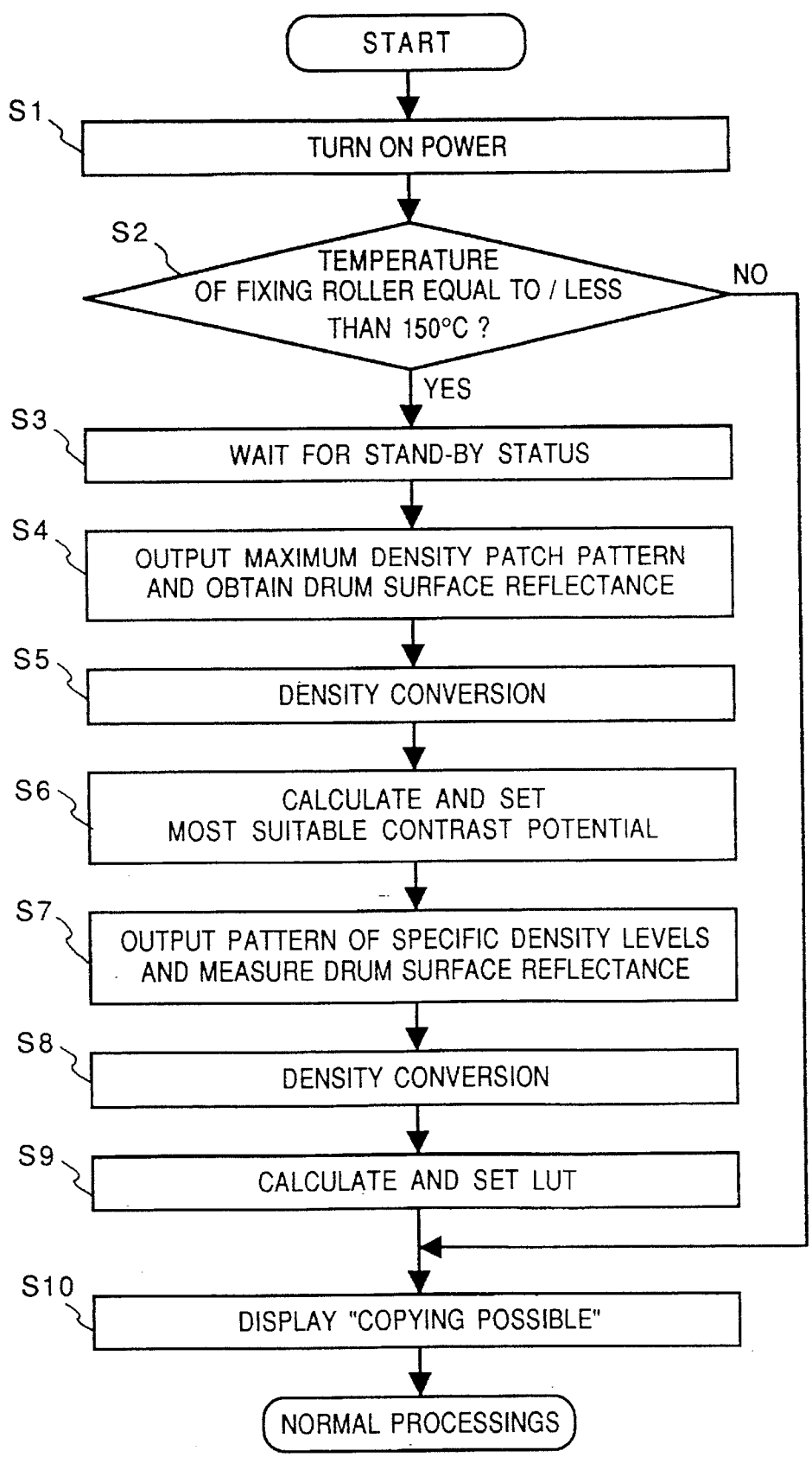
FIG. 12 is a flowchart showing tone-control processing upon switching-on of the copying machine in the first embodiment.

Next, density conversion characteristic setting processing upon switching-on of the copying machine in the present embodiment will be described with reference to a flowchart of FIG. 12. It should be noted that the control program for this processing is stored in the ROM 210.

First, in step S1, the power of the copying machine is turned on, and in step S2, whether or not the temperature of the fixing roller 114 is equal to or lower than 150° C. is examined by a thermistor (not shown). If YES (lower than 150° C.), the tone control is performed in step S3, while if NO (over than 150° C.), message "COPYING POSSIBLE" is displayed on the display of the operation panel 300 in step S10.

In step S3, the process waits until it is confirmed that the temperature of the fixing roller 114 has increased to a predetermined value (e.g. 150° C.) and the temperature of the semiconductor laser 103 has increased to a predetermined value, and the machine is in stand-by status. In step S4, the output signal level of the laser 103 is set to the maximum "255", and a toner image for a patch test pattern in this density is formed on the photosensitive drum 106. Then, the reflectance from the drum surface is obtained based on the photosensor 9 output, and in step S5, the photosensor 9 output is converted to an image density in accordance with the conversion characteristic as shown in FIG. 11.

Next, the difference between the obtained image density and a set maximum density of the copying machine is examined. In accordance with the difference, contrast potential of a bright-portion of a latent image to a dark-portion of the latent image to be formed on the photosensitive drum 106 is calculated, and the obtained potential is set in step S6.

Figure 13:
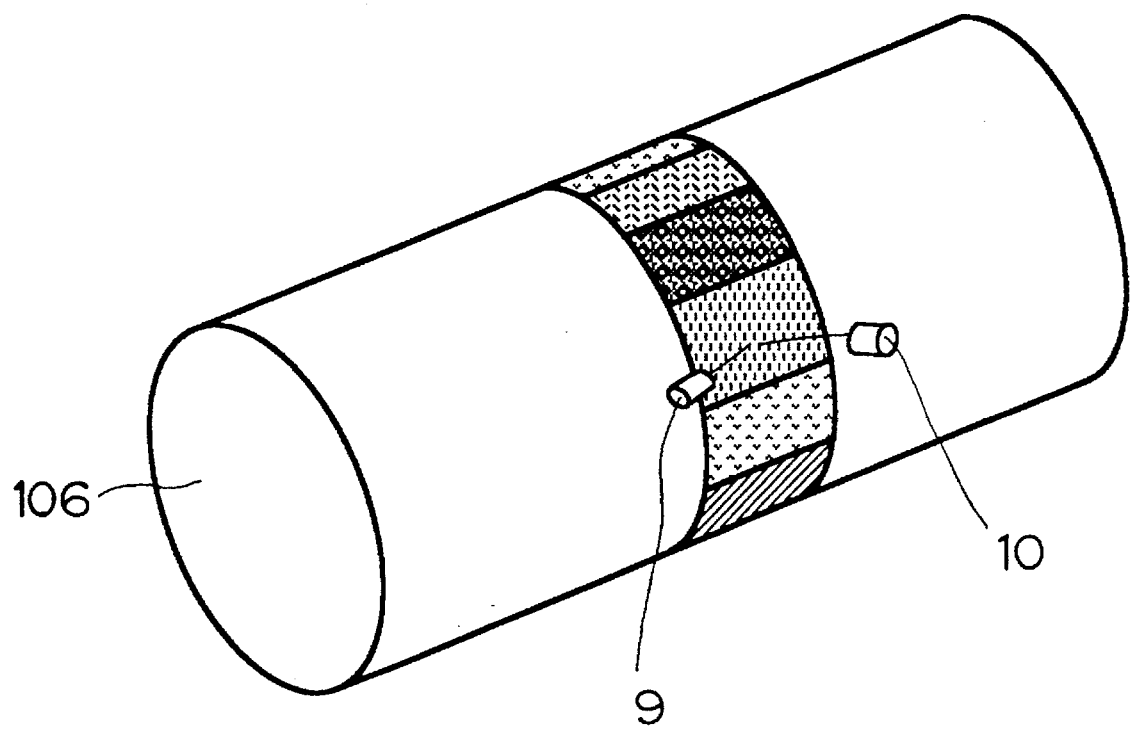
FIG. 13 illustrates detection of the density of a patch pattern formed on the photosensitive drum by the photosensor.

In step S7, a pattern of a color, e.g., yellow toner, of specific density levels is continuously formed around the photosensitive drum 106 as shown in FIG. 13. In this embodiment, a test pattern of sixteen density levels (16th, 32th, 48th, 64th, 80th, 96th, 112th, 128th, 144th, 160th, 176th, 192th, 208th, 224th, 240th, 255th levels in this embodiment) is formed. The reflection amount of the test pattern is measured at an appropriate timing by the LED 10 and the photosensor 9. In step S8, the photosensor output is converted to an image density in accordance with the conversion characteristic as shown in FIG. 11. Thus, the relation between the image density and the laser output value, i.e., the printer characteristic shown in the third quadrant in FIG. 4, can be exactly obtained from the reflection amount of the test pattern formed on the photosensitive drum 106, without forming a print image on a recording sheet.

In step S9, data for the LUT 25 for correcting image data based on the printer characteristic obtained in step S8 is calculated. The LUT data can be easily obtained from the printer characteristic, i.e., the LUT data can be calculated by reversing input-output relation of the printer characteristic (by obtaining a symmetrical data with the y-axis as the central axis as shown in FIG. 4). The above control is repeated for the respective colors. Thereafter, the message "COPYING POSSIBLE" is displayed on the operation panel 300 in step S10, and the machine becomes in stand-by status.

In actual copying operation, by performing density conversion based on the obtained LUT 25 data, tonality having a linear characteristic with respect to the semiconductor laser 103 can be obtained.

Next, a case where the copying machine has been used for a long term, and the density of a pattern formed on the photosensitive drum and that of an actually-printed image no longer correspond with each other, will be described below. For example, if a cleaning blade for removing untransferred toner is in contact with the photosensitive drum 106 for a long period, scattered light component of the photosensitive drum 106 increases. This makes the relation between the photosensor 9 output and an image density different from that in an initial status.

Figure 14:
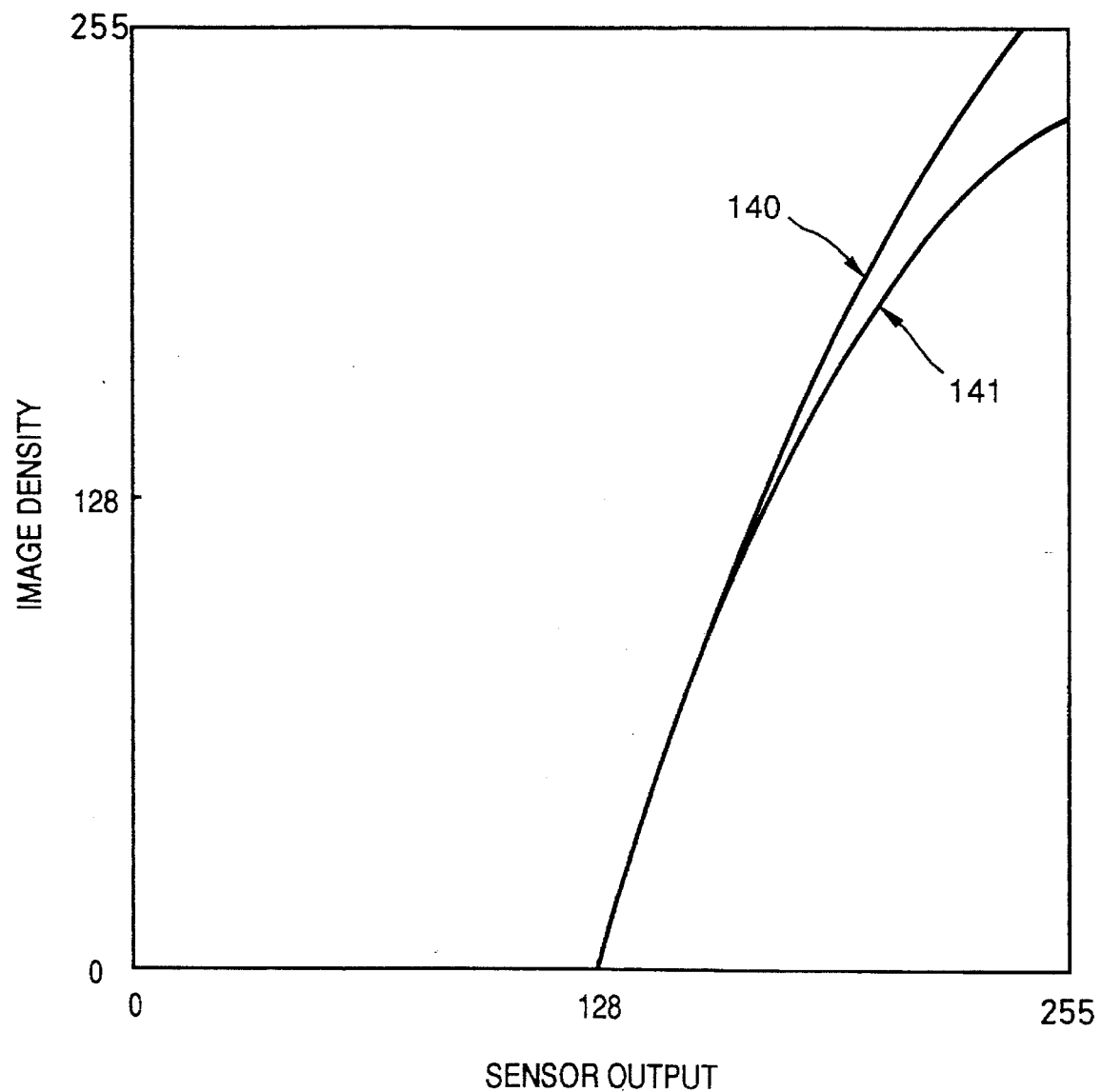
FIG. 14 is a line chart showing change between characteristic of reflected light amount from the photosensitive drum and that of output image data density.

FIG. 14 shows the relation between the sensor 9 output and the density of a pattern image formed on the photosensitive drum 106 with yellow toner. Numeral 140 denotes an initial sensor output characteristic; and 141, a sensor output characteristic after copying for ten-thousand sheets. This shows a tendency that the long-term utilization makes an image density detected by the photosensor 9 lower than that in the initial status.

Figure 15:
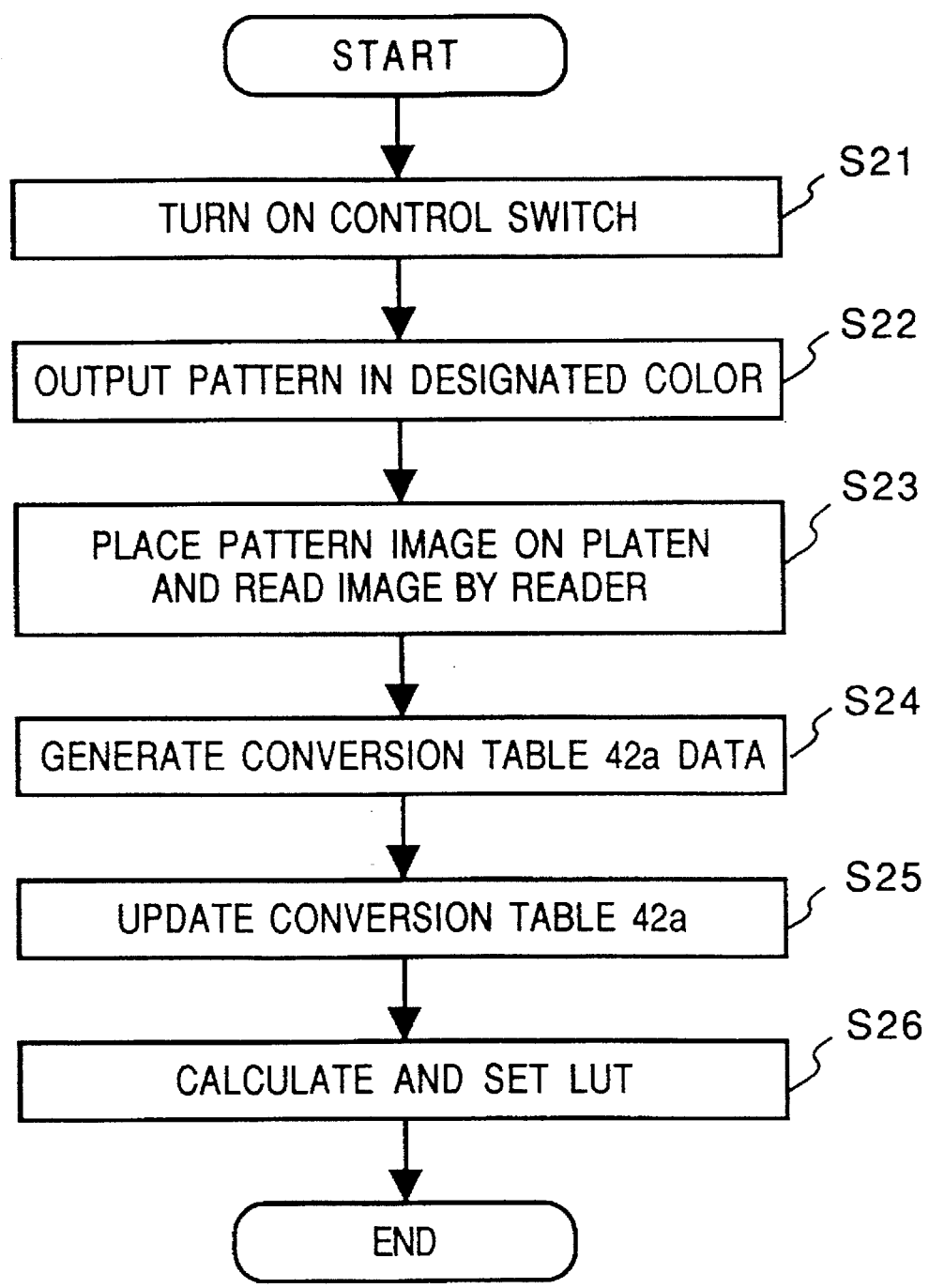
FIG. 15 is a flowchart showing updating processing of conversion table data and LUT data in a density converter according to the first embodiment of the present invention.

FIG. 15 is a flowchart showing the process of updating the data of the conversion table 42a and the LUT 25 in the copying machine of the present embodiment. The control program for this processing is stored in the ROM 210.

Figure 16:
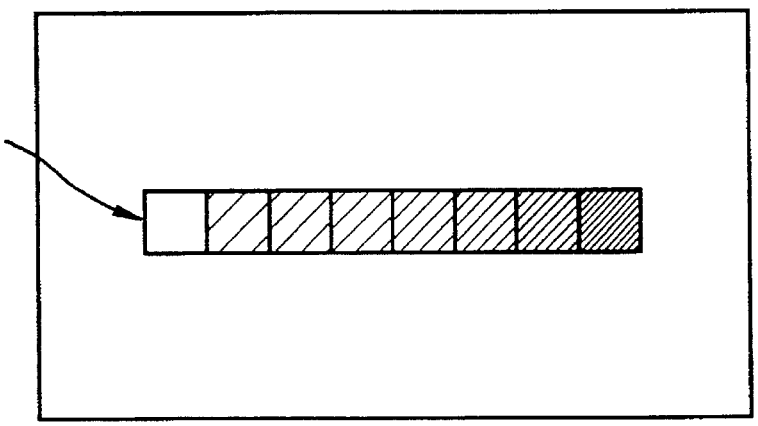
FIG. 16 illustrates a patch-pattern of tone levels in a designated color.

In step S21, a color of the conversion table to be updated is designated from the operation panel 300, and a control switch for instructing start of the processing is turned on. In step S22, a pattern of sixteen tone levels in the designated color (See FIG. 16) based on the test pattern stored in the ROM 210 is outputted by the pattern generator 29. The pattern of sixteen tone levels in the designated color is transferred onto the recording sheet.

In step S23, the operator places the recording sheet on a platen of the reader 202, as a print sample on which the pattern image is formed, and inputs a reading instruction from the operation panel 300. The pattern image signal read by the CCD 21 is A/D converted, shading-corrected, LOG-converted, and converted to a density data. In step S24, data of the conversion table 42a (as shown in FIG. 5) for the designated color is generated based on the relation between the density data and the laser output density upon test pattern outputting. To form the conversion table 42a data, the a linear interpolation may be adopted to generate data between sixteen-point data. Preferably, to improve precision, a non-linear interpolation or non-linear approximation may be applied. In step S25, the data of conversion table 42a is updated.

Next, in step S26, based on the relation between the density data and the laser output density, obtained in step S24, the LUT 25 data is calculated and the obtained table data is written into the LUT 25.

Thus, the embodiment enables even a copying machine used for a long term to form an image of excellent tonality by periodically performing the above processing.

SECOND EMBODIMENT

In the first embodiment, a pattern image in a designated single color is formed, and the conversion table data is updated based on the relation between the recording density and the output density. However, as the abovementioned problem, i.e., an original image density and the density of an actually-printed image do not correspond with each other, is likely to occur in all the color toners, the second embodiment is directed to correction to all colors, such as yellow, magenta, cyan and black.

Figure 17:
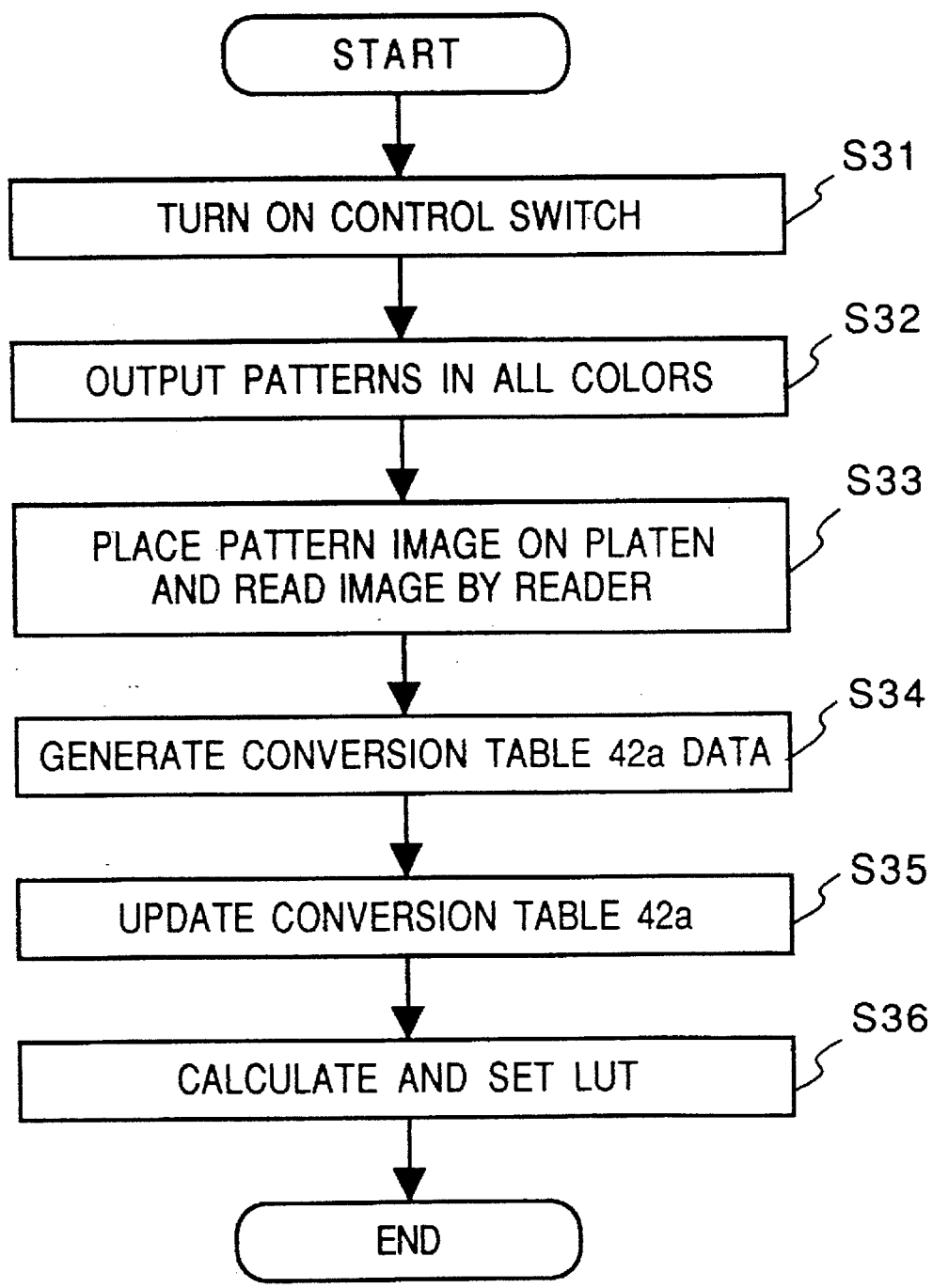
FIG. 17 is a flowchart showing updating processing of conversion table data and LUT data in a density converter according to a second embodiment of the present invention.

FIG. 17 shows the processing according to the second embodiment. The control program for this processing is stored in the ROM 210. Note that hardware construction of the second embodiment is identical to that of the first embodiment.

Figure 18:
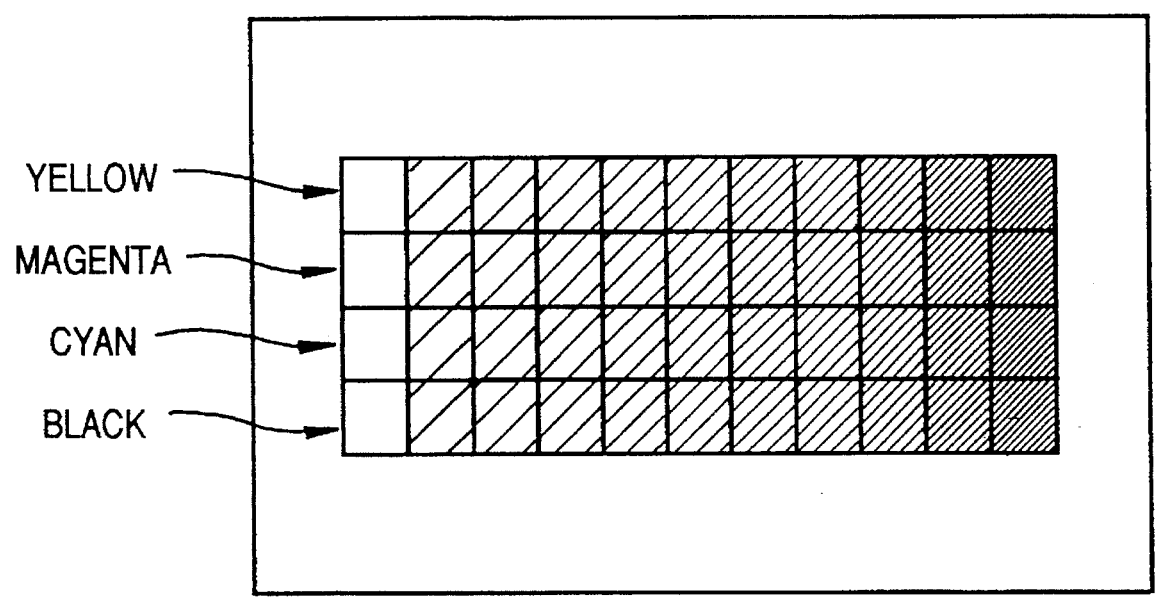
FIG. 18 illustrates a patch pattern of tone levels in all colors according to the second embodiment.

In step S31, the control switch on the operation panel 300 is turned on, similarly to step S21 in FIG. 15. Patterns respectively of sixteen tone levels in yellow, magenta, cyan and black as shown in FIG. 18 are sequentially outputted by the pattern generator 29 in step S22. Toner images of the patterns are sequentially formed on the photosensitive drum 106, and the respective color images are sequentially transferred on the recording sheet. Next, in step S33, the operator places the recording sheet on the platen of the reader 202 as a print sample, and inputs a reading instruction. Similarly to step S23, the pattern image is read by the CCD 21, LOG-converted and converted to a density data. In step S34, the relation between the density data (of the pattern image on the sheet) and the laser output density is obtained. The conversion table 42a data corresponding to the respective colors are obtained in a similar manner as that in step S25 in FIG. 15. In step S35, the conversion table 42a data are updated. Similarly to step S25, in step S35, the linear interpolation is performed to generate data between the sixteen-point data, however, preferably, non-linear interpolation or non-linear approximation may be applied to improve precision. In step S36, the data for all colors of the LUT 25 are calculated based on the relation between the density data and the laser output density, and the obtained data is set in the LUT 25.

Thus, the second embodiment enables to obtain an image of excellent tonality and good color balance.

It should be noted that the embodiments are described as a full-color digital copying machine. However, the present invention is not limited to the digital copying machine, but is applicable to a monochromatic digital copying machine.

Figure 19:
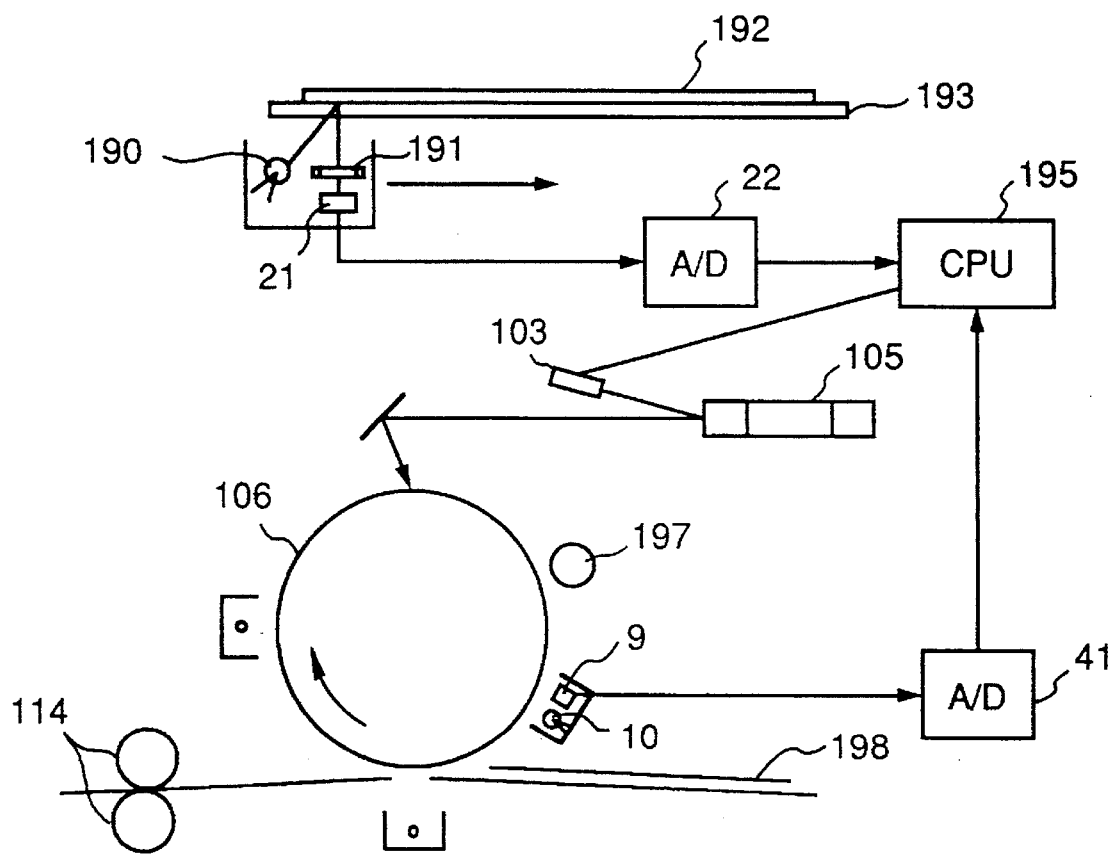
FIG. 19 is a sectional view of a monochromatic copying machine according to another embodiment of the present invention.

FIG. 19 is a sectional view of a monochromatic digital copying machine according to another embodiment. In FIG. 19, parts corresponding to those in the aforementioned embodiments have the same reference numerals.

In FIG. 19, reference numeral 190 denotes a light source for irradiating an original; and 191, a lens for focusing reflection light from the original. The CCD 21 reads the original, and the A/D converter 22 converts an image signal to a digital signal and outputs the digital signal to CPU 195. Numeral 192 denotes an original cover; and 193, a platen. Similarly to the aforementioned embodiments, the photosensor 9 detects the density of an image on the photosensitive drum 106, and the A/D converter 41 converts the density signal to a digital signal and outputs the digital signal to the CPU 195. Numeral 197 denotes a developer; and 198, a recording sheet.

This copying machine also obtains an image of excellent tonality for a long period by updating the data of density conversion table 42a and the LUT 25 in accordance with the flowchart in FIG. 15.

The present invention can be applied to a system in which a reader and a printer are separated, or to an apparatus having a reader and printer as an integrated unit. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A control method for controlling an image forming apparatus, comprising the steps of:

(a) a first generating step for generating an image signal representing a predetermined test image having a plurality of tone levels;

(b) forming the predetermined test image on a recording medium of the image forming apparatus, based on the image signal;

(c) a first measuring step for measuring density levels of the predetermined test image formed in the forming step, corresponding to each of the plurality of tone levels of the image signal;

(d) determining a characteristics of a change of density levels in the predetermined test image to a change of tone levels in the image signal, in the image forming apparatus, based on a plurality of density levels measured in the first measuring step, and making a conversion data table for converting tone levels of an input image signal in accordance with the characteristics;

(e) a second generating step for generating an image signal representing a predetermined test image having a plurality of tone levels and forming the predetermined test image on the recording medium of the image forming apparatus based on the image signal;

(f) transferring the predetermined test image formed in the second generating step to a recording sheet;

(g) a second step for measuring density levels of the predetermined test image on the recording sheet corresponding to each of the plurality of tone levels of the image signal generated in the second generating step; and (h) correcting the conversion data table based on the density levels measured in the second measuring step.

2. The method according to claim 1, wherein in said second measuring step, the predetermined test image on the recording sheet is read by an image reader which reads an original.

3. The method according to claim 1, wherein the image forming apparatus forms a color image by overlaying a plurality of images, each image having a different color component, and in first generating step, the image signal is generated corresponding to each of a plurality of color components, in the determining step, the conversion data table is made for each of the plurality of color components.

4. The method according to claim 3, wherein in said second generating step, the predetermined test image having a color component designated by a manual operation is formed on the recording medium, and in the correcting step, data in the conversion data table corresponding to the color component designated by the manual operation is corrected.

5. The method according to claim 3, wherein in the second generating step, the predetermined test image on the recording medium is formed in correspondence with each of the plurality of color components, and in the correcting step, data in the conversion data table is corrected in correspondence with each of the plurality of color components.

6. The method according to claim 1, wherein the conversion data table is stored into a non-volatile memory.

7. The method according to claim 1, wherein in the determining step, the conversion data table is made to change density levels of an output image linearly to a change of density level of an input image.

8. An image forming apparatus, comprising:

generating means for generating an image signal representing a predetermined test image having a plurality of tone levels;

image forming means for forming the predetermined test image on a recording medium based on the image signal;

first measuring means for measuring density levels of the predetermined test image formed by said image forming means, corresponding to each of the plurality of tone levels of the image signal;

control means for determining a characteristics of a change of density levels in the predetermined test image to a change of tone levels in the image signal, in said image forming means, based on a plurality of density levels measured by said first measuring means, and for making a conversion data table for converting tone levels of an input image signal in accordance with the characteristics;

designating means for generating an instruction for designating a correction of the conversion data table made by said control means;

transfer means for transferring an image formed on the recording medium to a recording sheet; and second measuring means for measuring density levels of the image recorded on the recording sheet;

wherein said control means controls said generating means, said image forming means, and said transfer means to record an image having a plurality of tone levels on a recording sheet, and causes said second measuring means to measure density levels of the image recorded on the recording sheet corresponding to each of the plurality of tone levels, and corrects the conversion data table based on the density levels.

9. The apparatus according to claim 8, wherein said second measuring means causes a reader which reads an original to read the image on the recording sheet and measures the density levels of the image read by the reader.

10. The apparatus according to claim 8, wherein said image forming means forms an image having a plurality of color components and said control means makes the conversion data table for each of the plurality of color components.

11. The apparatus according to claim 10, wherein said control means corrects the conversion table having a color component designated by an operator.

12. The apparatus according to claim 8, wherein the conversion table is stored in a non-volatile memory.

13. The apparatus according to claim 8, wherein said control means makes the conversion data table to change density levels of an output image linearly to a change of density level of an input image.

* * * * *